US007817151B2

(12) United States Patent
Zhang

(10) Patent No.: US 7,817,151 B2
(45) Date of Patent: Oct. 19, 2010

(54) HARDWARE CORRECTED SOFTWARE VERTEX SHADER

(75) Inventor: Guofeng Zhang, Shanghai (CN)

(73) Assignee: VIA Technologies, Inc., Taipei (TW)

( * ) Notice: Subject to any disclaimer, the term of this patent is extended or adjusted under 35 U.S.C. 154(b) by 759 days.

(21) Appl. No.: 11/582,013

(22) Filed: Oct. 17, 2006

(65) Prior Publication Data

US 2007/0091090 A1   Apr. 26, 2007

Related U.S. Application Data

(60) Provisional application No. 60/735,001, filed on Nov. 9, 2005, provisional application No. 60/727,957, filed on Oct. 18, 2005.

(51) Int. Cl.
*G06T 15/40* (2006.01)
*G06F 15/16* (2006.01)
*G06F 15/76* (2006.01)

(52) U.S. Cl. ................. 345/422; 345/503; 712/28; 712/32

(58) Field of Classification Search ........... 345/426, 345/424, 422, 503; 712/28, 32
See application file for complete search history.

(56) References Cited

U.S. PATENT DOCUMENTS

| 5,299,309 | A | * | 3/1994 | Kuo et al. ............ 345/541 |
| 6,407,736 | B1 | * | 6/2002 | Regan ................. 345/422 |
| 6,891,543 | B2 | * | 5/2005 | Wyatt ................. 345/541 |
| 7,015,909 | B1 | * | 3/2006 | Morgan, III et al. ...... 345/426 |
| 7,154,500 | B2 | * | 12/2006 | Heng et al. ........... 345/424 |
| 7,268,779 | B2 | | 9/2007 | Piazza |
| 7,388,581 | B1 | * | 6/2008 | Diard et al. ........... 345/421 |
| 7,570,267 | B2 | | 8/2009 | Patel |
| 2005/0041031 | A1 | | 2/2005 | Diard ................. 345/505 |
| 2006/0059494 | A1 | * | 3/2006 | Wexler et al. .......... 718/105 |

* cited by examiner

*Primary Examiner*—Kee M Tung
*Assistant Examiner*—Robert Craddock
(74) *Attorney, Agent, or Firm*—K&L Gates LLP

(57) ABSTRACT

This invention discloses a method for executing vertex shader in a computer system, the method comprising running software vertex shader for a predetermined vertex shader command in a CPU thread when a GPU is overloaded by vertex shader execution, buffering the output of the software vertex shader, running hardware vertex shader for z-values of the vertex shader command, and replacing z-values from the software vertex shader with the z-values from the hardware vertex shader, wherein the vertex shader overloading can be lessened yet the vertex shader z-values are consistently transformed by the hardware vertex shader.

15 Claims, 2 Drawing Sheets

HARDWARE CORRECTED SOFTWARE VERTEX SHADER

CROSS REFERENCE

This application claims the benefits of U.S. patent application Ser. No. 60/735,001, which was filed on Nov. 9, 2005 and entitled "HW CORRECTED SOFTWARE VERTEX SHADER", as well as U.S. patent application Ser. No. 60/727,957, which was filed on Oct. 18, 2005 and entitled "DRIVER OPTIMIZATION FOR GPU BOUND APPS ON MULTICORE-CPU."

BACKGROUND

The present invention relates generally to a computer graphics system, and, more particularly, to graphics device drivers.

A typical computer graphics system comprises a graphics adapter providing a frame buffer and graphics acceleration hardware, together with a software device driver providing an interface between the graphics adapter hardware and the operating system (OS) and/or application software running on top of the operating system. The graphics adapter serves to facilitate a display of elaborate graphics while relieving the computer's central processing unit (CPU) of computational responsibility for graphics processing, and improving overall performance.

A device driver, often called a driver for short, is a computer program that enables another program, typically an OS, to interact with a hardware device. In a Windows OS environment, when an application calls a Win32 function with device-independent graphics requests, the Graphics Device Interface (GDI) interprets these instructions and calls the display driver. The display driver then translates these requests into commands for the video hardware to draw graphics on the screen.

A shader is a program used in 3D computer graphics to describe the traits of either a vertex or a pixel. With shader programs, seemingly complicated surfaces can be rendered from simple geometry. For example, a shader can be used to draw a grid of 3D ceramic tiles from a simple plane.

Vertex shaders describe the traits (position, texture coordinates, colors, etc.) of a vertex, while pixel shaders describe the traits (color, z depth and alpha value) of a pixel.

Pixel shaders often have to be "driven" by the vertex shaders. For example, to calculate per-pixel lighting, a pixel shader needs the orientation of a triangle, the orientation of a light vector and in some cases the orientation of a view vector. The output rate of the pixel shader determines the performance of the GPU as a pixel shader at a later stage than the vertex shader in a 3D pipeline.

The most rendered image requires cooperation of the vertex shader and the pixel shader. If the vertex shader load is higher than the pixel shader load, the pixel shader has to wait for the vertex shader, which will reduce the pixel shader's output rate. So balancing the loading of the vertex shader and pixel shader is an effective way to increase performance.

Traditionally, both vertex and pixel shader programs run on dedicated graphics processing units (GPUs) in the graphics adapter. In a multi-Core CPU system with multi-thread capability, a graphics driver can direct an idle CPU thread to do a software vertex shader. But before the software vertex shader finishes, the driver is still held up and cannot issue subsequent commands to GPUs, which may cause GPU idling.

Another issue with using the software vertex shader is a so called z-fighting, which is caused by greater precision in z-depth. For example, in a 16-bit z-buffer, the z-value can be any integer number between 0 and 65535 ($2^{16}$). Software vertex shader and GPU hardware vertex shader may have different resolution. If a first vertex is processed by a software vertex shader and an adjacent second vertex with the same z-value as the first vertex is processed by a hardware vertex shader with a different resolution, then z-values of the first and second vertex after the vertex shader transformation becomes different, which is not acceptable.

Meanwhile the x and y value do not have such precision issues, as shader transformed values of x and y are limited by a display screen size, which is not larger than 2048 and is much smaller than even a 16-bit z-buffers 65535. Besides, the origin of both the x and y axes is at the center of the display screen, so their resolution requirements are further reduced by one half.

It is therefore desirable for a driver on one hand, to allow multi-Core CPU to be able to share some vertex shader computational load, on the other hand still to be able to maintain uniform z-values after shader transformation, and at the same time maximizing both CPU and GPU utilization through command buffering.

SUMMARY

In view of the foregoing, this invention provides a method for executing vertex shader in a computer system, the method comprising running software vertex shader for a predetermined vertex shader command in a CPU thread when a GPU is overloaded by vertex shader execution, buffering the output of the software vertex shader, running hardware vertex shader for z-values of the vertex shader command, and replacing z-values from the software vertex shader with the z-values from the hardware vertex shader, wherein the vertex shader overloading can be lessened yet the vertex shader z-values are consistently transformed by the hardware vertex shader.

DESCRIPTION

The present disclosure provides a method for balancing calculation loads of vertex shader and pixel shader while maintaining uniform data transformation.

Figure 1:
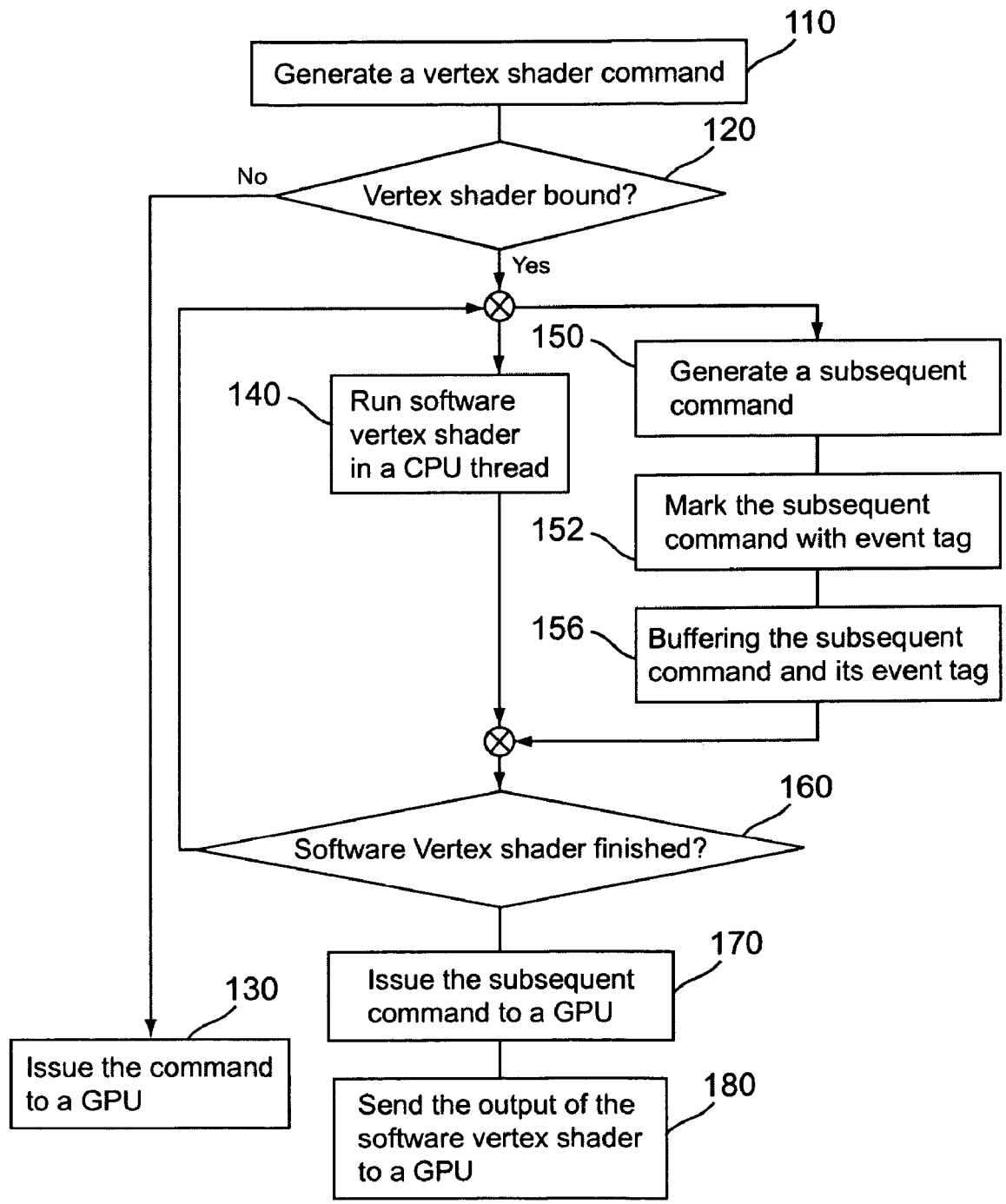
FIG. 1 illustrates steps taken for running software vertex shader and command buffering according to one embodiment of the present invention.

FIG. 1 illustrates steps taken for running software vertex shader and command buffering according to one embodiment of the present invention.

A software vertex shader is to run the vertex shader program in a thread of a central processing unit (CPU), while traditional vertex shader program is run in a dedicated unit of graphic processing unit (GPU), which is referred to here as hardware vertex shader. A need to run software vertex shader rises when the GPU is heavy on vertex shader and light on pixel shader, or so called vertex shader bound. For example, when drawing an object with a complicated surface, which means large amount of vertices, but occupies just a small area which means small amount of pixels, then the amount of vertex shader calculation will far outweigh the amount of pixel shader calculation. As vertex and pixel information almost always needs to combine to draw an object, so in a vertex shader bound situation, the GPU's pixel shader unit will be held up in idle to wait for the vertex shader program to finish. The present invention discloses a method for solving the vertex shade problem.

Referring to FIG. 1, after a vertex shader command is generated in step 110, a display driver will check if this draw will be a vertex shader bound situation for the GPU in step 120. If the vertex shader and pixel shader are balanced or the pixel shader outweighs the vertex shader, then the display driver will simply issue the vertex shader command to the GPU in step 130.

Note that software calculation by a CPU thread is not used for relieving pixel shader bound situations, because pixel shader often needs vertex information to progress. If vertex shader is being carried out in the GPU while the pixel shader, which frequently calls for vertex information, is being carried out in the CPU, frequent communications between the CPU and the GPU make this method less efficient and less desirable. On the other hand, the vertex shader is rather independent from the pixel shader, so there are advantages in separating the calculations.

Referring again to FIG. 1, if the GPU is vertex shader bound, then the display driver will send the vertex shader command to a CPU thread in step 140 to run software shader. Before the vertex shader program finishes, subsequent commands cannot be sent to the GPU, but they can be generated in step 150, and marked with corresponding event tags in step 152, then buffered in step 156. Once the software vertex shader is found finished in step 160, the display driver can issue the subsequent command to the GPU right away from the buffer in step 170, instead of running through a generating process. Then the output of the software vertex shader is sent to the GPU as well in step 180. In this way, a CPU thread can share some vertex shader load while not holding up command generating.

Software vertex shader is only activated during a vertex shader bound situation, other than that, the vertex shader is still run on the GPU hardware, i.e., in the same drawing some vertices are transformed by software vertex shader and some other vertices are transformed by hardware vertex shader. But since software and hardware vertex shaders have different calculation resolution, their outputs shown on the same drawing may create faulty effects, especially in z direction, where resolution is as high as $2^{16}=65535$ for even a 16-bit application.

Figure 2:
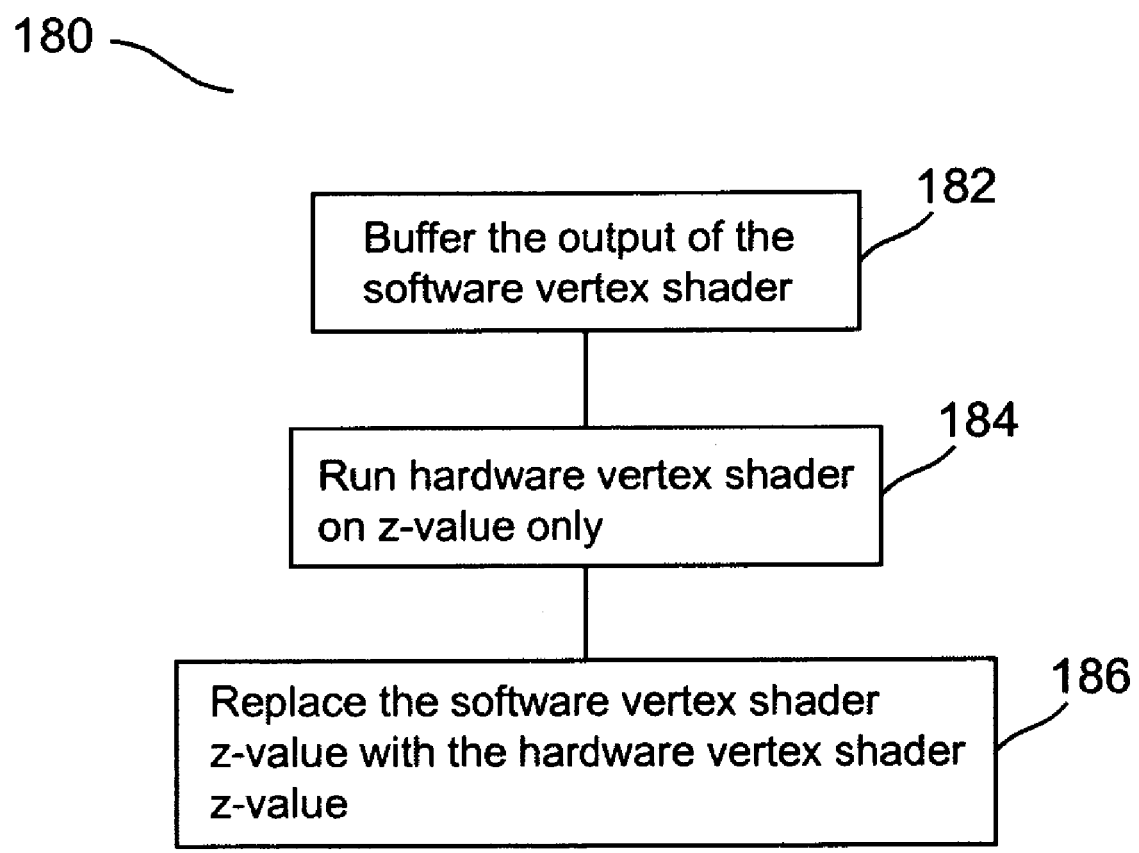
FIG. 2 illustrates steps taken for using hardware to correct the z-value after software vertex shader according to one embodiment of the present invention.

FIG. 2 illustrates steps taken for using hardware to correct z-value after the software vertex shader according to one embodiment of the present invention. The display driver first buffers the outputs from the software vertex shader in step 182, and lets the GPU run hardware vertex shader on the z data only in step 184. The z-value from the hardware vertex shader is then used to replace the z-value from the software vertex shader in step 186. So, the drawing will have z-values all being transformed by the same hardware vertex shader with uniform resolution.

This invention provides many different embodiments, or examples, for implementing different features of the invention. Specific examples of components and methods are described to help clarify the disclosure. These are, of course, merely examples and are not intended to limit the disclosure from that described in the claims.

What is clamed is:

1. A method for executing vertex shader in a computer system, the method comprising:
   running a first vertex shader in a first CPU thread for a predetermined vertex shader command when a GPU is overloaded by a vertex shader execution;
   buffering an output of the first vertex shader;
   running a second vertex shader in the GPU for z-values of the predetermined vertex shader command; and
   replacing z-values produced by the first vertex shader with the z-values produced by the second vertex shader.

2. The method of claim 1, wherein the first vertex shader is a CPU executed software vertex shader.

3. The method of claim 1, wherein the second vertex shader is a GPU executed hardware vertex shader.

4. The method of claim 1, wherein running the first vertex shader further comprises detecting if the GPU is overloaded by vertex shader execution.

5. The method of claim 1, further comprising buffering a first command subsequent to the predetermined vertex shader command while the first vertex shader is still running in the first CPU thread.

6. The method of claim 5, wherein buffering the first command comprises:
   generating the first command; and
   marking the first command with a corresponding event tag.

7. The method of claim 5, further comprises issuing the first command after the first vertex shader is finished.

8. A method for executing vertex shader in a computer system, the method comprising:
   running a first vertex shader in a first CPU thread for a predetermined vertex shader command when a GPU is overloaded by vertex shader execution;
   buffering a first command subsequent to the predetermined vertex shader command while the first vertex shader is still running in the first CPU thread;
   buffering an output of the first vertex shader;
   running a second vertex shader in the GPU for z-values of the predetermined vertex shader command; and
   replacing z-values produced by the first vertex shader with the z-values produced by the second vertex shader.

9. The method of claim 8, wherein the first vertex shader is a CPU executed software vertex shader.

10. The method of claim 8, wherein the second vertex shader is a GPU executed hardware vertex shader.

11. The method of claim 8, wherein buffering the first command comprises:
    generating the first command; and
    marking the first command with a corresponding event tag.

12. The method of claim 8 further comprising issuing the first command after the first vertex shader is finished.

13. A method for executing the vertex shader in a computer system, the method comprising:
    running a first vertex shader in a first CPU thread for a predetermined vertex shader command when a GPU is overloaded by vertex shader execution;
    generating a first command subsequent to the predetermined vertex shader command while the first vertex shader is still running in the first CPU thread;
    marking the first command with a corresponding event tag;
    buffering the first command with the corresponding event tag;
    buffering an output of the first vertex shader;
    issuing the first command after the first vertex shader is finished;
    running a second vertex shader in the GPU for z-values of the predetermined vertex shader command; and
    replacing z-values produced by the first vertex shader with the z-values produced by the second vertex shader.

14. The method of claim 13, wherein the first vertex shader is a CPU executed software vertex shader.

15. The method of claim 13, wherein the second vertex shader is a GPU executed hardware vertex shader.

* * * * *